(12) United States Patent
Froelich

(10) Patent No.: US 10,050,933 B2
(45) Date of Patent: Aug. 14, 2018

(54) STRUCTURAL DATA FERRY SYSTEM

(71) Applicant: Michael Froelich, Austin, TX (US)

(72) Inventor: Michael Froelich, Austin, TX (US)

( * ) Notice: Subject to any disclaimer, the term of this patent is extended or adjusted under 35 U.S.C. 154(b) by 0 days.

(21) Appl. No.: 14/545,832

(22) Filed: Jun. 25, 2015

(65) Prior Publication Data

US 2017/0054682 A1 Feb. 23, 2017

(51) Int. Cl.
*G06F 15/16* (2006.01)
*H04L 29/06* (2006.01)
*G06F 1/16* (2006.01)

(52) U.S. Cl.
CPC ............... *H04L 63/02* (2013.01); *G06F 1/16* (2013.01)

(58) Field of Classification Search
None
See application file for complete search history.

(56) References Cited

U.S. PATENT DOCUMENTS

| | | | |
|---|---|---|---|
| 5,703,562 A | 12/1997 | Sandia | |
| 6,578,140 B1 * | 6/2003 | Policard | G06F 21/567 709/224 |
| 8,205,072 B1 * | 6/2012 | Gentil | G06F 21/53 713/150 |
| 9,130,906 B1 | 9/2015 | Sheehan | |
| 2002/0166067 A1 * | 11/2002 | Pritchard | G06F 21/554 726/4 |
| 2004/0230791 A1 | 11/2004 | Boebert | |
| 2006/0156400 A1 * | 7/2006 | Shevchenko | G06F 21/50 726/22 |
| 2011/0047627 A1 * | 2/2011 | Sheymov | H04L 63/1425 726/26 |
| 2012/0017079 A1 * | 1/2012 | Mraz | H04L 9/3236 713/153 |
| 2012/0304279 A1 * | 11/2012 | Hargis | H04L 63/0209 726/14 |
| 2012/0331097 A1 | 12/2012 | Menoher | |

* cited by examiner

*Primary Examiner* — Brandon S Hoffman
(74) *Attorney, Agent, or Firm* — K Karel Lambert; Lambert Patent Services, LLC

(57) ABSTRACT

A system allowing computers to be un-connected to the internet or networks generally while still allowing computers to share data on networks. By creating a one-way secure data link from a primary computer not connected to a network to a intermediate buffer computer which is network connected, the primary computer can distribute data via the buffer computer over the network without the risks associated with a direct connection to the internet or other networks.

19 Claims, 2 Drawing Sheets

STRUCTURAL DATA FERRY SYSTEM

CROSS REFERENCE TO RELATED APPLICATIONS

This application is related to U.S. Provisional Patent No. 62/020,127, filed 14 Jul. 2014, and further claims priority under 37 USC § 119(e) thereto. Said patent application is herein incorporated in full by reference for all purposes.

STATEMENT REGARDING FEDERALLY SUPPORTED RESEARCH OR DEVELOPMENT

Not applicable.

TECHNICAL FIELD

Preferred embodiments relate to a system having a primary computer that is un-connected to all networks and a buffer computer that is connected to at least one network; in which the primary computer and the buffer computer share one common display, one common keyboard, and one common housing.

STATEMENT REGARDING PRIOR DISCLOSURES BY THE INVENTOR

No public disclosures of the invention were made prior to publication as U.S. Pat. Appl. Doc. No. 2017/0054682

BACKGROUND

Connecting computers to networks has always contained the risk that they could be penetrated with unwanted code via other computers with which they are connected. With the advent of the internet this security problem has become extremely serious. Unlike previous networks in which a limited number of computers were connected to each other, with the internet or world wide web there are so many computers participating from so many different locations that the security problems have become extreme. The advantages of a global network include sharing data or work product on the internet with other users. Users later discovered that by so doing they exposed their computers to various unwanted code from other state and non-state users on the internet. These forms of unwanted code can penetrate other computers using the internet and perform unwanted functions. Some of these functions include cyberattacks and espionage, cybercrime, cyberwarfare, and other forms of malicious, unwelcome or offensive activities which injure or harm the user.

This awful state of affairs was never necessary. If users such as individuals, governments, institutions and businesses had been forewarned of the possibility of these risks, they never need to have connected their computers containing vital or sensitive files or programs to the internet. It was always possible to keep their computers un-connected to the internet but enjoy the advantages of sharing data created by their computers by using a second or buffer computer which was on the internet and then transferring data from the un-connected computer to the buffer computer by a variety of secure external means such as disks or flashdrives. In this way such devices can be loaded with data from the computer un-connected to the internet and then the device connected to the un-secure buffer computer connected to the internet and then the data loaded from the device into the buffer computer to create a file which can be distributed via the internet. By this means it has always been possible to keep certain sensitive computers un-connected to the internet and yet allow data from those computers to be shared on the internet using a buffer computer. If governments, institutions, businesses and individuals had done this then there would be little if any of the security problems which have been created.

Although it's always been possible to avoid internet risks to computers by simply keeping them off the internet and using buffer computers for the internet and to distribute data thereon, there have been unsolved problems. One problem is that this involves having two computers in two different cases. This is not as convenient as having the two computers paired into a single case. Having a single case saves room, is more modular, and allows for ease of use and portability. Another problem is the physical inconvenience of relying on external data transport systems such as flashdrives or disks to move data or files from one computer which is un-connected to the internet to the buffer computer which is connected to the internet.

SUMMARY

The purpose of the invention is to end all security risks stemming from the internet by allowing computers to share data such as work product made on such computers but without having to be connected to the internet.

My invention divides all computers into two kinds. One kind are computers in which valuable or sensitive programs and files reside. These computers are used by individuals, governments, institutions, utilities, among other users and businesses for their vital functions. These vital computers should never be connected to the internet, and are not connected to the internet in my invention. The second kind of computer are computers dedicated for internet use. These buffer computers store no valuable or necessary programs or files. These buffer computers are used to navigate the internet and use it for many purposes, however it is understood that by doing so that the computer is exposed to all manner of risks from unwanted code from malevolent sources. This buffer computer will accumulate unwanted code from the internet but from time to time the computer will be wiped clean of all code.

My invention places both computers as a pair into a single case with a single keypad and screen. The user can use the internet with the buffer computer, which contains no sensitive programs or files. When the buffer computer gets loaded down with unwanted code the user can simply wipe it clean of all code. But within the same case and using the same keypad and screen is also contained the user's other computer in which the user maintains his vital programs and files which are not intended to be exposed to the internet. That computer has no network connections but possesses flashdrive, disk or other non-network connectors. That computer can however transport data to the buffer computer so such data can be sent or distributed on the internet by the buffer computer. My invention creates a secure on-way data link which ferries data from the un-connected computer to the buffer computer. This device cannot transfer data from the buffer computer to the un-connected computer. It is not possible for unwanted code to travel from the buffer computer to the un-connected computer. In this manner the un-connected computer. In this manner the un-connected computer remains safe from unwanted code which would otherwise penetrate it from sources via the internet.

The computer which is connected to the internet serves the purpose of a mere browser computer which only operates internet functions. The user operates the browser computer or system using the keypad and screen attached to the computer case if the computer is a desktop or other non-laptop or portable computer, or within the computer case if the computer is a portable or laptop system design.

However within the same computer case is also a "primary" computer which is never connected to the internet. This is termed the primary computer of the user because it is a computer with substantial computing power, speed, memory storage, and other facilities such that it is suitable for use for the user's many non-internet functions. These functions are conducted by the programs and software the user needs for the computer to conduct the vital functions of the user. These functions relate to everything required of the computer and it's programs to operate the user's core needs, be the user an individual, a company, a business, a government, an institution, or any other kind of organization or individual. This primary computer possesses no network connectors, and cannot be connected to the internet.

The user operates the primary computer for the user's needed functions and in so doing from time to time creates work product or files consisting of data which the user wants to use the internet for distribution to others or publication. To do this safely my invention possesses a one-way data transfer link from the primary computer to the browser computer. The user simply uses the keypad and screen shared by the two computers, or pair of systems, to operate the one-way data transfer link. The user employs the keypad and screen as controls to load data files from the primary computer into the data transfer device, or ferry. Once the intended files are loaded into the device, or ferry, the device disconnects from the primary computer and travels, or ferries, the data mechanically or electronically to the browser computer system by attaching to it and loading the intended data files into it. Once the browser computer has received the data file then the device, or ferry, disconnects from the browser computer system. Once the ferry device is disconnected from the browser computer system it is automatically wiped clean of all data. Once all data has been cleaned or purged from the ferry device then it moves mechanically or electronically back for re-attachment to the primary computer system so it may receive another load of data for transfer.

In my invention the primary computer and the browser computer systems share the same screen and keypad. The user can instruct the keypad and other controls on the computer case to switch from one computer to the other. In this system the user can use the browser for the internet functions when desired and use the same keypad and screen to operate the primary computer when needed. My invention can also be configured for larger computers which cannot be fitted into a single case or use a single keypad or screen. My invention applies to all computers of any size or scale in which the primary functions of the user are operated by one or more computers which are dis-connected from the internet but use secure data transfer systems to ferry files from the secure computer system to less secure computers which are connected to the internet or other networks.

These and other elements, features, steps, and advantages of the invention will be more readily understood upon consideration of the following detailed description of the invention, taken in conjunction with the accompanying drawings, in which presently preferred embodiments of the invention are illustrated by way of example, and in the claims.

The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the inventive art disclosed here are more readily understood by considering the drawings in conjunction with the written description including the claims, in which:

Figure 1:
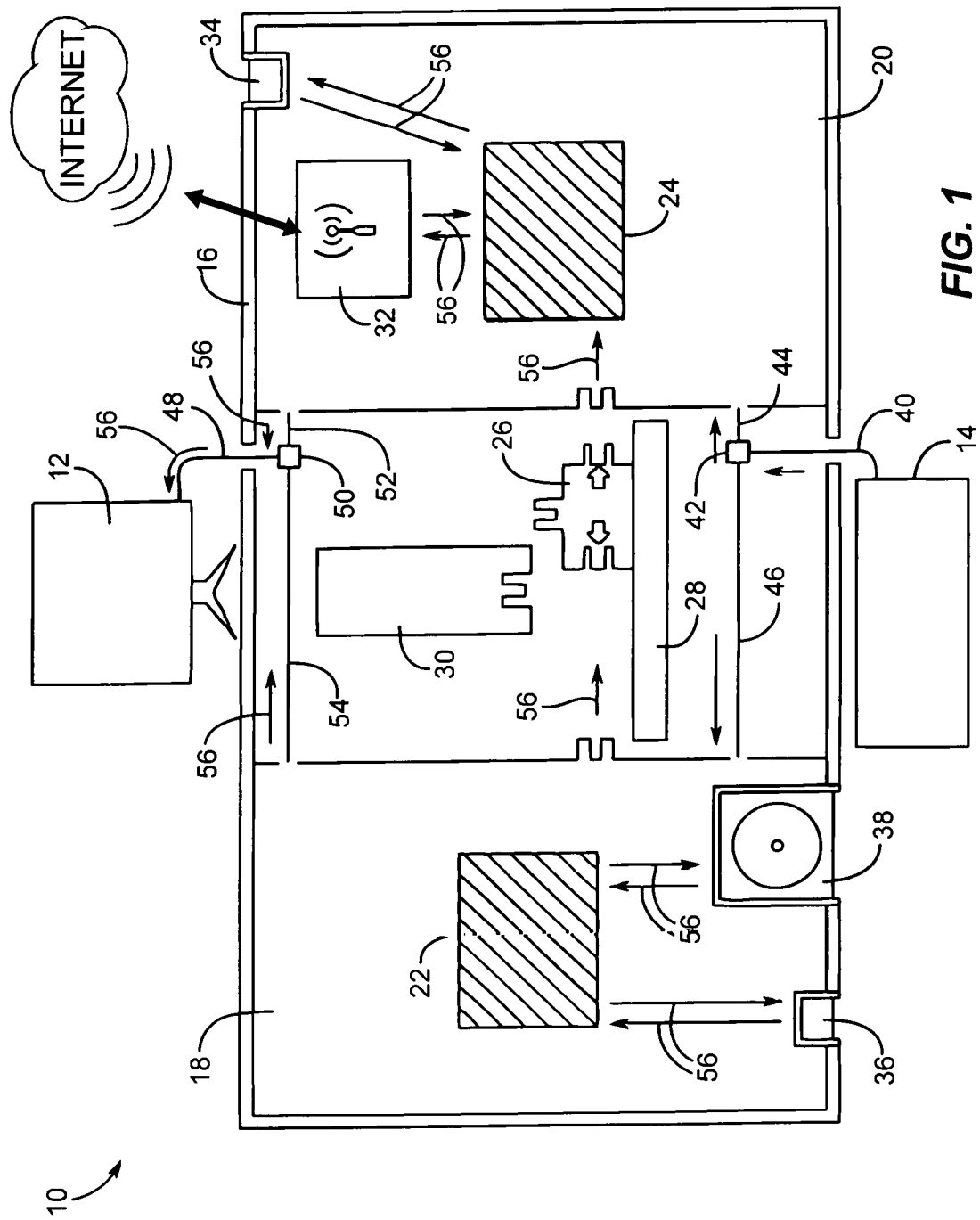
FIG. 1 is a schematic of a system (10) having a primary and a buffer computing machine that are joined by a data ferry and that share a common keyboard, monitor, and housing and in which a wireless card connects the buffer computing machine to the internet.

The drawing figures are not necessarily to scale. Direction of motion may be shown by arrows without further explanation where the meaning would be obvious to one skilled in the arts. Certain features or components herein may be shown in somewhat schematic form and some details of conventional elements may not be shown in the interest of clarity, explanation, or conciseness. It is to be expressly understood that the drawings are for illustration and description only and are not intended of themselves as a definition of the limits of the invention.

DETAILED DESCRIPTION

Although the following detailed description contains specific details for the purposes of illustration, one of skill in the art will appreciate that many variations and alterations to the following details are within the scope of the claimed invention. The following glossary is set forth as an aid in explaining the invention as claimed.

As stated above, Computer users almost always use the same computer for internet/intranet use as for all their other sensitive or confidential uses. When they use their computers with sensitive files and data stored therein for internet/ intranet use they open their sensitive files to examination, corruption or destruction by others who penetrate their computers. The common methods to counter-measure such penetrations such as the use of firewalls and software to counter access of files or disk storage are ineffective and costly. The invention claimed here solves this problem.

My invention prevents anyone from accessing sensitive files or data on a computer through the internet or other external sources through structural architecture of the computer making protective measures such as anti-penetration software unnecessary. By placing within one computer chassis two independent sets of microprocessors and drives, or systems, which are structurally separate one microprocessor/ drive, can be used to store sensitive files and data with no direct connection to the outside through the internet or other means. A second microprocessor/drive unconnected to the first can be used to access the internet and other vulnerable outside means. To allow the user to send data or files from the first, secured system, to the second, unsecured system, a one way data ferry is made. One way of creating a secure data ferry is to load a data drop connected to the secured system which can then be disconnected from it and then travel to the unsecured system, connect to it, and unload or download the data it conveys. Then before the data drop, or ferry, is re-connected to the secured system it can be wiped completely clean so no data from the unsecured system is transferred to the secured system.

The claimed invention differs from what currently exists. Protective anti-virus, anti-spyware, anti-malware, and all other protective software and firewalls are subject to penetration and countermeasures rendering such protective measures costly, cumbersome and ineffective. The only effective way to prevent sensitive files and data from being accessed from outside sources such as the internet is to use two computers—one for sensitive data and a second for internet use. Then if the user wishes to email or send data from the first computer he must use a flashdrive, disk or other mechanism to selectively transfer particular data from the first to the second so it may be sent out. This architecture is cumbersome and expensive. As well the means for transferring data from the first to the second may be compromised unless conscious actions are taken to make sure the flashdrive or other means is not contaminated by its connection to the second computer.

This invention is an improvement on what currently exists. Protective anti-virus, anti-spyware, anti-malware, and all other protective software and firewalls are subject to penetration and countermeasures rendering such protective measures costly, cumbersome and ineffective. The only effective way to prevent sensitive files and data from being accessed from outside sources such as the internet is to use two computers—one for sensitive data and a second for internet use. Then if the user wishes to email or send data from the first computer he must use a flashdrive, disk or other mechanism to selectively transfer particular data from the first to the second so it may be sent out. This architecture is cumbersome and expensive. As well the means for transferring data from the first to the second may be compromised unless conscious actions are taken to make sure the flashdrive or other means is not contaminated by its connection to the second computer.

Software to provide counter-measures to malware, spyware, or other unwanted penetrating code are expensive, troublesome to install and update, and have vulnerabilities rendering them ineffective. The alternative of using two independent computers requires that two different keyboards and screens be used which takes up unnecessary space and is inconvenient relative to using a single keyboard and screen. Then the means employed of transferring data from the non-internet/intranet computer to the one connected to the outside must be consciously wiped clean or disposed of so and new and uncontaminated device may be safely used.

By placing two independent sets, or systems, of microprocessors and hard drives into one computer chassis, and creating a secure data ferry which is automatically wiped clean and sanitized after each use there are not two different computer keyboards, screens, among other redundancies to be negotiated. As well because the data ferry is automatically wiped clean and sanitized there is no risk that its prior connection to the internet connected unsecured system will contaminate the secured system which contains the sensitive data.

The Version of the Invention Discussed Here Includes:
1. secured drive/processor system with accompanying software
2. unsecured drive/processor system with accompanying software
3. data ferry
4. data ferry conveyance mechanism
5. data ferry sanitation device with accompanying software Relationship Between the Components:

As shown in FIG. 1, a bidirectional wireless link is shown connecting the data ferru system 10 to the internet (shown here as a cloud).

Number 3 the DATA FERRY is used to store data from the Number 1 SECURED SYSTEM DRIVE/PROCESSOR/ACCOMPANYING SOFTWARE by connecting to it and receiving data from it. Once Number 3 the DATA FERRY has received the data it disconnects from Number 1 the SECURED SYSTEM DRIVE/PROCESSOR/ACCOMPANYING SOFTWARE and Number 4 the DATA FERRY CONVEYANCE MECHANISM physically or electronically moves Number 3 the DATA FERRY and/or it's contained stored data to connect to Number 2 the UNSECURED SYSTEM DRIVE/PROCESSOR/ACCOMPANYING SOFTWARE where it is available for attachment to emails or other means of transference out of the computer. Once Number 3 the DATA FERRY has unloaded its data to Number 2 the UNSECURED DRIVE/PROCESSOR/ACCOMPANYING SOFTWARE it is disconnected from Number 2 the UNSECURED SYSTEM DRIVE/PROCESSOR/ACCOMPANYING SOFTWARE and then is automatically wiped clean of all data of any kind Number 5 the DATA FERRY SANITATION DEVICE WITH ACCOMPANYING SOFTWARE.

Figure 2:
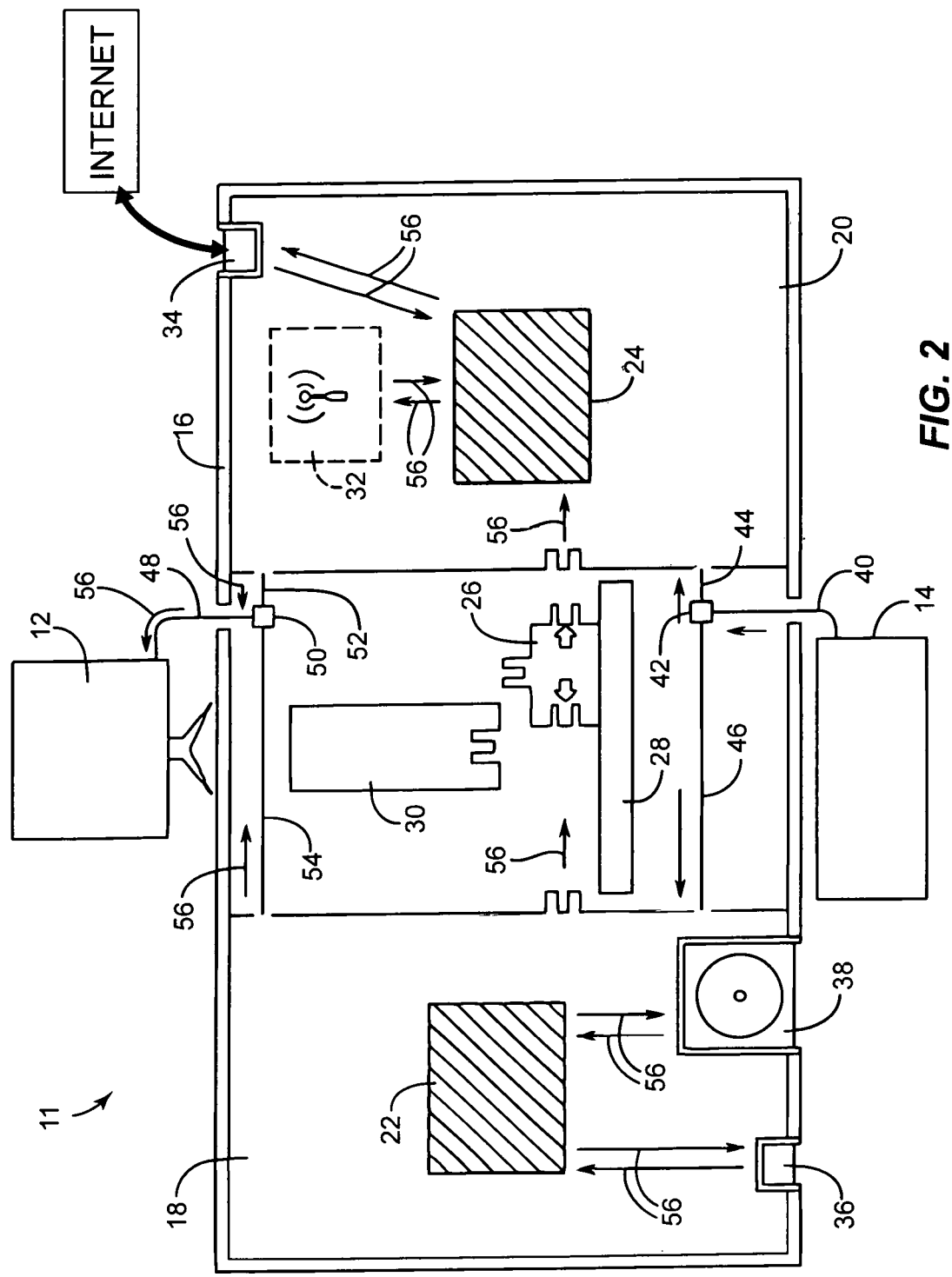
FIG. 2 is a schematic of a system (11) having a primary and a buffer computing machine that are joined by a data ferry and that share a common keyboard, monitor, and housing and in which a hardwired network connector connects the buffer computing machine to the internet.

FIG. 2 illustrates a data ferry system 11 with a wired internet connection and an optional wireless board 32.

How the Invention Works:

The UNSECURED SYSTEM DRIVE/PROCESSOR/ACCOMPANYING SOFTWARE is a data system which can perform any of the applications desired by a computer except for connection to, and exporting data to, the world outside of itself. For that reason it never needs to be cleaned because it will never be accessed or penetrated from outside. When the user wishes to take data from it and send it to others he commands the DATA FERRY [which has been previously cleaned] to attach itself mechanically or electronically to the SECURED SYSTEM DRIVE/PROCESSOR/ACCOMPANYING SOFTWARE and the latter device system loads the DATA FERRY with the desired data. Once the DATA FERRY is loaded with data it disconnects from the SECURED SYSTEM DRIVE/PROCESSOR/ACCOMPANYING SOFTWARE and the DATA FERRY CONVEYANCE MECHANISM physically/mechanically or electronically conveys the DATA FERRY and/or its data to connect to the UNSECURED SYSTEM DRIVE/PROCESSOR/ACCOMPANYING SOFTWARE. Once the UNSECURED SYSTEM DRIVE/PROCESSOR/ACCOMPANYING SOFTWARE has received the data it may use the data for emailing or other transferral functions via a wireless internet connected system (10) or a wired connection system (11) to an internet or intranet or telephonic connection or any other connectivity function which the computer user wishes to perform. By performing this function this way, by this system, the computer user is only exposing the UNSECURED SYSTEM DRIVE/PROCESSOR/ACCOMPANYING SOFTWARE to penetration from outside and corruption or examination of data therein. Only the UNSECURED SYSTEM DRIVE/PROCESSOR/ACCOMPANYING SOFTWARE need be cleaned in order to purge it of unwanted code while the SECURED SYSTEM DRIVE/PROCESSOR/ACCOMPANYING SOFTWARE remains pristine. To assure that the SECURED SYSTEM DRIVE/PROCESSOR/ACCOMPANYING SOFTWARE remains pristine after the DATA FERRY disconnects from the UNSECURED SYSTEM DRIVE/PROCESSOR/ACCOMPANYING SOFTWARE the DATA FERRY is wiped clean of any data by the DATA FERRY SANITATION DEVICE WITH ACCOMPANYING SOFTWARE.

How to Make the Invention:

Take the internal mechanisms of two computers: their hard drives and accompanying processors, and assemble them into two independent computing systems installed into a single computer chassis with a single keyboard and screen. Then give each of the two systems of drives and processors its own software so that they can be independently operated from the same keyboard, mouse or screen. Create a data ferry by installing a data memory device between the two systems, and construct a mechanism for the ferry and/or its contained data to be moved or conveyed so as to be connected and disconnected between the two systems. Make sure that the memory device, or data ferry, cannot be connected to both systems at the same time. Design the conveyance for the memory device, or data ferry, between the two systems so that after it has been disconnected from the unsecured system into which it's data is transferred that it automatically is wiped clean of all data by a device appropriate to do so which itself cannot be corrupted by any data the memory device may contain.

The two systems with their accompanying software are necessary as is the data ferry/memory device and its conveyance mechanism and the sanitizing device which wipes it clean before it is re-connected to the secure system. None of these parts are optional except for the data ferry sanitizing device if the data ferry is constituted such that it cannot receive data from the unsecured system or the unsecured system is constituted in such a way that it cannot transfer data to the data ferry.

The data ferry may itself be physically moved between the secured and unsecured systems by the conveyance mechanism. However the same function may be conducted by the data ferry remaining stationary and the data it conveys being transferred to it and then to the unsecured system by means of electrical gates which can be securely opened and shut. For this system to work these gates like the data ferry sanitizing device must be completely independent from the unsecured system, or corruption of the system could be used to control the gates such that they could allow data to pass from the unsecured system via the data ferry to the secured system. No sanitizing device for the data ferry is required if it is constituted to not be able to receive data from the unsecured system or the unsecured system is constituted so it cannot transfer data to the data ferry.

How to Use the Invention:

The user or operator would shift back and forth between the two unconnected and independent systems depending on the task performed. When the user wishes the convenience of using a system connected to the internet for purposes which are not sensitive and require no security he may use the unsecured system. He may keep few software packages on the unsecured system and clean it of unwanted code from time to time by wiping its hard drive and other components clean without having to reload many software programs. However when the user wishes to perform tasks for which security is desired and wishes to store software programs which cannot be easily unloaded and reloaded when a hard drive, among other memory components is cleaned, then the user can use the secured system. Whenever the user wishes to load or transfer data into the secure system he can do so through flash drives or disks for which he maintains discretion and accounting/management. Otherwise there is no way that the secured system can be penetrated or its codes or data accessed by unintended parties. Then when the user wishes to transport data from the secured system to parties outside of his computer he can instruct the data ferry conveyance system to connect the clean data ferry to the secure system so the desired data can be loaded into it. Once the data is loaded into the data ferry it [or its data] is conveyed to the unsecured system, and the data is transferred to it. When the data has been transferred to the unsecured system the data ferry disconnects automatically from the unsecured system and is wiped clean of all data by the sanitizing device. The user can use the transferred data in the unsecured system for transmittal to outside parties via email or any other means the user can instruct the unsecured system to do.

Additionally: The use of a data ferry as described can be used to transfer data between a secured device and an unsecured device although the devices may not be computers but other forms of electronic devices uses data or signals or information such as radio transmitters or receivers or telephones, and related embodiments.

Example I

Referring to FIG. 1, two computers were installed in the same housing. A first computer 22 is termed the primary computer, a second computer 24 is termed the buffer computer. The buffer computer has a wired or wireless port 32,34 to the Internet. The primary computer has no outside network access. Both computers have a processor, a persistent memory with instructions executable by said processor, and a memory for storing data. The two computers share a system data router configured to switchably route keyboard data between a shared keyboard and the primary computer or the buffer computer in alternation. Also shared is a monitor node, in which the monitor node is configured to send display data to a-display monitor, in which the display monitor is switchedly shareable by the primary computer and the buffer computer. The computer case also houses a data transfer device. The data transfer device is operated electromechanically, and includes a data ferry 26 and a conveyance mechanism 28. Data is transferred in only one direction, from the primary computer to the buffer computer, as indicated by arrows 56. The data ferry 26 has an internal dedicated memory, a loading data connector on a first aspect (left side), an unloading data connector on a second aspect (right side), in which the connectors are not simultaneously connectable for data transfer. In order to achieve a data transfer, the data ferry cyclically moves back and forth (open arrows).

The conveyance mechanism 28 is able to move the data ferry between a first end of the conveyance mechanism and a second end. The first end (left) includes a first link connector linkable to a databus of the primary computer and the second end comprises a second link connector linkable to a datalink of the buffer computer. In this embodiment, the conveyance mechanism is a rail that supports the data ferry and a prime mover the moves the data ferry back and forth along the rail. The conveyance mechanism is configured to disconnectably engage the first link connector with the loading data connector of the data ferry in a first state (defined by a digitally connection to the primary computer so as to transfer data into the dedicated memory; i.e., the data ferry engages the connector to the left), to disconnectably engage the second link connector with the unloading data connector of the data ferry in a second state (defined by a digitally connection to the buffer computer so as to unload data from the dedicated memory; i.e., the data ferry engages the connector to the left). The data ferry is disconnectably connectable to the databus digital connectors in order of operation. The cyclical data transfer operation of the data ferry begins with a command to load data from the primary computer into the dedicated memory on the data ferry. The data ferry is then disconnected from the first data connector, is moved along the conveyance mechanism, and is connected to the second data connector, where it is unloaded automatically from the dedicated memory onto a databus of the buffer computer. The data ferry is automatically conveyed to a third state (in which the data ferry not connected to either link connector) between each cycle of the data transfer operation. The data ferry can repeat this cycle until all data identified for transfer has been received by the buffer computer. For example, this can be the textual contents of an email that is then sent across wireless port 32. The data transfer device connects to the first link connector on a command from the primary computer and loads data, and then executes the data transfer operation from the primary computer to the buffer computer and returns to the third state automatically between load and unload cycles. Generally, the data ferry with dedicated memory is configured to cycle in the data transfer operation between the first state connected to the primary computer and the second state connected to the buffer computer under control of a keyboard with keyboard router. However, in another embodiment, the data ferry includes a third data connector, a disconnectable data wipe connection to a sanitation device, in which the sanitation device is configured to wipe data and commands from the dedicated memory of the data ferry after it transfers data and disconnects from the second databus (right). The sanitation device 30 is generally positioned near the middle of the range of travel of the data ferry on the conveyance mechanism. The sanitation apparatus may include instructions to wipe any data or code in the dedicated memory in response to a purge command or automatically in a cycle.

Scope of the Claims

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

REFERENCE NUMBERS OF THE DRAWINGS

10: is the overall structural data ferry system invention.
11. is an embodiment having a hardwired data ferry system of the invention.
12: is the monitor.
14: is the keypad or keyboard.
16: is the computer case.
18: is the secured system.
20: is the unsecured system.
22: is the secured hard drive/CPU/GPU/software.
24: is the unsecured hard drive/CPU/GPU/software.
26: is the data ferry.
28: is the data ferry conveyance mechanism.
30: is the data ferry sanitation device.
32: is the wireless card.
34: is the network connector.
36: USB port.
38: is disk burner/reader.
40: is the data link/route from keyboard to computer.
42: is the secured system/unsecured system data router (keypad data).
44: is the unsecured system data route from data router (keypad data).
46: is the secured system data route from data router (keypad data).
48: is the data link/route from computer to monitor.
50: is the monitor data node.
52: is the unsecured system data route to data node.
54: is the secured system data route to data node.
56: indicates direction of current.

The invention claimed is:

1. A computing machine for use in securing network data exchanges, which comprises a computer case having a primary computer inside that is un-connected from all networks and a buffer computer inside that is connectable to at least one unsecure network; wherein each said computer comprises a processor, a persistent memory with instructions executable by said processor, a memory for storing data; wherein said computer case comprises:

a) a system data router configured to switchably route keyboard data between a shared keyboard and said primary computer or said buffer computer in alternation;

b) a monitor node, wherein said monitor node is configured to send display data to a display monitor, wherein said display monitor is switchedly shareable by said primary computer and said buffer computer;

c) a data transfer device, wherein said data transfer device comprises:

i) a data ferry having an internal dedicated memory, a loading data connector on a first aspect, an unloading data connector on a second aspect, wherein said connectors are configured to be not simultaneously connectable for data transfer;

ii) a conveyance mechanism for moving said data ferry between a first end of said conveyance mechanism and a second end thereof; wherein said first end comprises a first link connector linkable to a datalink of said primary computer and said second end comprises a second link connector linkable to a datalink of said buffer computer;

iii) wherein said conveyance mechanism is configured to disconnectably engage said first link connector with said loading data connector of said data ferry in a first state (defined by a digitally connection to said primary computer so as to transfer data into said dedicated memory), to disconnectably engage said second link connector with said unloading data connector of said data ferry in a second state (defined by a digitally connection to said buffer computer so as to unload data from said dedicated memory);

iv) wherein said data ferry is disconnectably connectable to said connectors in order of operation, operations of said data ferry comprising a cyclically sequential data transfer operation whereby data is first loaded into said dedicated memory from said first link connector of said primary computer, disconnected from said first data connector, connected to said second data connector, and unloaded automatically from said dedicated memory onto said second link connector of said buffer computer; and further wherein said data ferry is automatically conveyed to a third state (defined as a data ferry not connected to either link connector) between each cycle of said data transfer operation;

(v) wherein said data ferry is configured to connect to said first link connector on a command from said primary computer and to then execute said data transfer operation from said primary computer to said buffer computer and return to said third state automatically; and, (d) a network capability to connect to the internet, wherein said network capability is accessible by only said buffer computer.

2. The computing machine of claim 1, wherein said data ferry with dedicated memory is configured to cycle in said data transfer operation between said first state connected to said primary computer and said second state connected to said buffer computer under control of a keyboard with keyboard router.

3. The computing machine of claim 1, wherein in said third state, said data ferry comprises a disconnectable data wipe connection to a sanitation device, wherein said sanitation device is configured to wipe data and commands from said dedicated memory device after disconnecting from said second datalink.

4. The computing machine of claim 2, wherein said data ferry is configured to physically disconnect from said primary computer between each said data transfer cycle.

5. The computing machine of claim 2, wherein said data ferry is configured to digitally disconnect said digital connection from said primary computer between each said secure data transfer event.

6. The computing machine of claim 2, wherein said data ferry is configured to have separate access to said memory in said buffer computer and to said memory in said primary computer, and further to disable any direct digital data connection between said buffer computer and said primary computer.

7. The computing machine of claim 2, wherein said data ferry comprises a dedicated memory and a sanitation apparatus or instructions in software configured to wipe any data or code in said data ferry memory after each said data transfer operation.

8. The computing machine of claim 7, wherein said data ferry sanitation apparatus or instructions in software are configured to wipe any data or code in said dedicated memory in response to a purge command or automatically in a cycle.

9. The computing machine of claim 1, wherein said buffer computer comprises an internet browser and said primary computer has no internet browser.

10. The computing machine of claim 1, wherein said buffer computer comprises a wireless internet communications capability and said primary computer has no wireless internet communications capability.

11. The computing machine of claim 2, wherein said primary computer has a USB port, a disk burner, or other non-network connector.

12. The computing machine of claim 1, wherein a user is enabled to reversibly switch keyboard and monitor connections from said primary computer to said buffer computer during regular use.

13. The computing machine of claim 12, wherein said keyboard and monitor connections are independently switchable under control of an operator.

14. The computing machine of claim 1, wherein said primary computer comprises an inactive copy of all data or code on said buffer computer, and is configured to periodically wipe said buffer computer and reinstall said code through said data ferry.

15. A method for protecting a computing system from harm, which comprises
a) providing a primary computer and a buffer computer in a common housing, wherein said primary and said buffer computer are connected by a keyboard data router, a common monitor node, and a data ferry having a dedicated memory;
b) cycling said data ferry to a first state in which said data ferry is digitally connected to said primary computer so as to load data or code from said primary computer into said dedicated memory;
c) cycling to a second state in which said data ferry is digitally connecting to said buffer device so as to transfer any contents of said dedicated memory into said buffer computer; and,
d) while cycling, switching said monitor from displaying data from said primary computer to said buffer computer and switching said keyboard from entering data from said secure computer to entering data from said buffer computer in response to a command issued by an operator via said keyboard data router.

16. The method of claim 15, which comprises cycling through a third state in which said data ferry is not digitally connected to said primary computer or said buffer computer.

17. The method of claim 15, which comprises digitally disconnecting from said primary and said buffer computers when not in use.

18. The method of claim 15, which comprises wiping said dedicated memory between each cycle.

19. The method of claim 16, comprising providing said data ferry with a connection to a sanitation device; and wiping said dedicated memory after disconnecting said data ferry from said second link connector on said buffer computer.

* * * * *